United States Patent Office

2,990,378
Patented June 27, 1961

2,990,378
HYDROPHILIC POLYESTER-URETHANE CELLULAR PRODUCTS AND METHOD OF PREPARING SAME
Marvin J. Hurwitz and Ellington M. Beavers, Elkins Park, Pa., assignors to Rohm & Haas Company, Philadelphia, Pa., a corporation of Delaware
No Drawing. Filed Jan. 14, 1957, Ser. No. 633,838
23 Claims. (Cl. 260—2.5)

The present invention relates to the production of polyester-urethane foamed or cellular products which are of hydrophilic character and are capable of swelling in water and absorbing large quantities thereof.

Polyester-urethane foams have been prepared by the mixing of polyester or alkyd resins with a small amount of water and with polyisocyanates, pouring the mixture into suitable molds or spaces in which they are to be expanded into cellular form and then allowing expansion to occur either at atmospheric pressure and ambient temperatures or at elevated temperatures as desired. The products thereby obtained have been of hydrophobic character and have a wide variety of uses in which their hydrophobicity has been advantageous. However, such products, because of their hydrophobic character, have not been adequately suitable for use in washing and cleaning purposes where natural sponges and artificially-produced cellulosic sponges have found extensive use.

It is the object of the present invention to provide polyester-urethane cellular products which have water-absorptive qualities adapting them to be used for washing and cleaning purposes. Other objects and advantages of the invention will appear or be expressly stated in the following description.

In accordance with the present invention, cellular products are formed of polyester-urethanes in the usual way from polyesters which comprise as one component thereof an alpha, beta-unsaturated aliphatic dibasic acid, such as maleic acid or anhydride, fumaric acid and itaconic acid or mixtures of them. After the production of the foamed or cellular product, it is treated with an alkali metal sulfite or bisulfite in aqueous solution with the introduction thereby of sulfonic acid or salt groups into the foamed mass by addition of the sulfite or bisulfite across the unsaturated bonds present as a result of the use of the unsaturated acid in the making of the polyester.

The preparation of the cellular product may be effected in normal fashion by mixing one or more polyesters, including a polyester containing unsaturated points as a result of the use of one of the above-mentioned unsaturated dicarboxylic aliphatic acids in its preparation, with a small amount of water and a polyisocyanate with or without additional materials, such as fillers and so on.

The polyisocyanates that may be used may be any organic polyisocyanate or mixtures thereof, such as the isomeric mixtures normally resulting from their production, and especially the hydrocarbon polyisocyanates including ethylene diisocyanate, trimethylene diisocyanate, tetramethylene diisocyanate, hexamethylene diisocyanate, decamethylene diisocyanate, p-phenylene diisocyanate, m-phenylene diisocyanate, naphthalene diisocyanates, benzene 1:3:5-triisocyanate, toluylene diisocyanates, toluene-2:4:6-triisocyanate, ethylbenzene-2:4:6 - triisocyanate, monochlorobenzene-2:4:6-triisocyanate, triphenylmethane-4′:4″:4″-triisocyanate and diphenyl-2:4:4′-triisocyanate, toluene-2,4-diisocyanate, toluene-2,6-diisocyanate, diphenylmethane-4,4′-diisocyanate, 3,3′-dimethyl-diisocyanato-biphenyl, and 3,3′-dimethoxy-4,4′-diisocyanato-biphenyl. The polyisocyanates have various reactivities, some being much slower than others. For example, diphenylmethane-4,4′-diisocyanate is highly reactive whereas the 3,3′-dimethoxy-4,4′-diisocyanato-biphenyl is relatively slow. To compensate for the difference in reactivity, the proportion added may be increased for the slower ones and decreased for the faster ones or basic catalysts, such as tertiary amines may be included, especially with the slower ones. Mixtures of the polyisocyanates may be used of which a preferred combination is a mixture of toluene-2,4-diisocyanate and either 3,3-dimethoxy-4,4′-diisocyanato-biphenyl or 3,3′-dimethyl-4,4′-diisocyanato-biphenyl.

The polyesters may be prepared in normal fashion provided some component of its is a polyester derived from an unsaturated acid of the type mentioned above. There may be used a mixture of a polyester obtained exclusively from a saturated dibasic aliphatic acid with a polyester obtained exclusively from an unsaturated aliphatic dibasic acid, such as the maleic acid or any of those mentioned above, and when a mixture of polyesters is thus used, they may be used in the proportion of 1:9 to 2:1 mole ratio of unsaturated polyester to saturated polyester. Preferably, they may be used in approximately equimolar ratios. Instead of using a mixture of such polyesters, a combination polyester obtained by the simultaneous esterification with polyols of a mixture of the saturated and unsaturated dibasic aliphatic acids may be used. In this event, the mixture of dibasic acids should comprise at least 10 mole percent of the unsaturated acid and it may comprise as much as 30 to 35 mole percent. Preferably, about 25 to 30 mole percent of the unsaturated acid is employed. As stated above, the polyesters, whether made of saturated acid exclusively and unsaturated acid exclusively and then mixed or from a combination of unsaturated and saturated acids, may be made in conventional fashion. Illustratively, the general procedure may be that of the following discussion which applies to the making of a combined unsaturated-saturated acid polyester and the same general procedure may be used for making the polyesters exclusively from saturated or unsaturated acids respectively when such separate polyesters are to be mixed.

Thus, the polyester may be formed by first condensing a mixture of dibasic aliphatic acids comprising 10 to 30 mole present of maleic acid or anhydride, fumaric acid, or itaconic acid, and 90 to 70 mole percent of a saturated dibasic aliphatic acid having from 5 to 10 carbon atoms with a polyol, such as a diol, or a mixture of polyols which may contain at least 2 mole percent of a polyol having three or more hydroxyl groups therein. For example, the polyol may comprise up to 100 mole percent by weight of a diol, such as ethylene glycol, diethylene glycol, propylene glycol, dipropylene glycol, and trimethylene glycol, 1,3-butane-diol, 1,4-butane-diol, and 1,5-pentane-diol. Examples of the polyols containing more than two hydroxyl groups that may be used include glycerine, sorbitol, pentaerythritol, inositol, tetramethylolcyclohexanol, and di- and poly-pentaerythritol, trimethylolpropane, and so forth, but tri-methylolethane is preferred. Preferably, the proportion of diol is not over 95 mole percent of the entire polyol component and, of course, the diol may be completely absent.

The saturated aliphatic dicarboxylic acid that is used may be adipic acid, succinic acid, glutaric acid, sebacic acid or the like. Preferably it contains from 5 to 8 carbon atoms, but it may contain 4 to 18 carbon atoms.

The polyol and dibasic aliphatic acids are mixed in the proportion of 1.2 to 1.8 moles of polyol to each mole of acid, preferably 1.2 to 1.5 moles of polyol being used for each mole of acid. The mixture is heated to a temperature within the range of about 200° to 260° C., preferably in the presence of an inert gas, such as carbon dioxide, nitrogen, argon, helium, when atmospheric or higher pressures are employed. If desired, a reduced pressure may be used during the reaction to remove the water formed on esterification and to favor a shift in the equilibrium toward the esterification product. Pressures of 20 to 50 mm. or more absolute pressure may be used. Optionally, an esterification catalyst may be used, such as 0.1 to 1% of sulfuric acid, toluenesulfonic acid, zinc chloride, or phosphorus pentoxide. Such catalyst, however, is not necessary. The reaction is carried out until the acid number is reduced to a value of 10 or less. Preferably, the acid number is reduced to a value of less than 5. The polyester resin may have a Gardner-Holdt viscosity up to Z–10. Lower viscosities facilitate mixing with the required reactants for producing the polyester-urethane foam.

The polyester obtained has terminal hydroxyl groups and also some hydroxyl groups at intervals along the polyester molecule.

Instead of using the free dibasic acids themselves as the starting materials in this esterification reaction, there may be used the lower alkyl diesters of the dibasic acids, such as the dimethyl or diethyl esters. Reaction in this case involves an ester interchange and sometimes has the advantage of yielding a product having less color. In this procedure, the alcohol liberated is boiled off.

Optionally, the polyester may be modified with a fatty acid having 8 to 30 carbon atoms, such as lauric acid, stearic acid, oleic acid, linoleic acid, linolenic acid, palmitic acid, and ricinoleic acid. The modification may be effected by directly reacting the fatty acid with the polyol or with the hydroxyl-containing polyester; alternatively, the same result may be effected by transesterification, in which case an ester of the fatty acid, such as an ester thereof with glycerol, is reacted with the polyol or the hydroxyl-containing polyester in the presence of a suitable catalyst, such as an alkali metal alkoxide. There should be used from 1 to 3 moles of polyol or polyol mixture to each mole of the fatty acid (or the equivalent thereof in the case of an ester thereof when transesterification is employed); preferably there is used from about 1.2 to 1.5 moles of polyol to each mole of acid or equivalent of ester. When modification with a fatty acid is resorted to, it is preferable to react the monobasic fatty acid or its ester (in the case of transesterification) with the polyol or a part of it before the polyol is reacted with the dibasic acid. Thus, when a modified polyester is desired, the fatty acid or ester thereof, such as a fat or oil, is first mixed with the polyol or polyol mixture and the esterification or transesterification with the monobasic fatty acid is carried out under the same conditions as stated hereinabove in respect to the esterification with the dibasic acids. Thus, the temperature may be from 200° to 260° C.; the pressure from 20 mm. absolute up to atmospheric or higher, an inert gas being used preferably at atmospheric or higher pressures. Optionally, an esterification or transesterification catalyst may be used as before. The reaction is continued until the acid number reaches a value of 10 or less. Preferably, it is continued until the acid number reaches a value of less than 1. It is desirable that the monobasic acid be completely bound up in the ester product, and to this end the most desirable condition is attained when the acid number approaches or reaches a value of substantially zero. The esterification product obtained from the polyol and monobasic acid is then mixed with the dibasic acid mixture and any additional amount of polyol needed to bring the proportion of polyol used in the entire condensation reaction to a proportion of between 1.2 to 1.8 moles of polyol to one mole of dibasic acid. This esterification reaction is continued at the same conditions as stated hereinabove in describing the preparation of the simple polyester unmodified with monobasic acid. As in the previous case, the reaction is continued until the acid number of the product is reduced to a value of 10 or less and preferably to a value of less than 5. The oil-modified polyester in this instance has some of its hydroxyl groups esterified with monoacyl radicals derived from the fatty acid. Of course, a mixture of fatty acids may be employed instead of a single one and similarly a mixture of dibasic acids comprising 10 to 30 mole percent of maleic or other unsaturated acid is employed instead of a single one whether an oil-modified polyester or an unmodified polyester is to be prepared up to this point.

In the preparation of the foam or cellular product, which again may be effected in known and conventional manner, the polyester or polyester mixture is mixed with a small amount of water, about 1 to 5 parts by weight thereof per 100 parts per total polyester, and from 17 to 80 parts of one or more polyisocyanates is mixed in per 100 parts of the polyester content. If fillers are employed, there may be used up to 50 parts thereof per 100 parts of polyester and preferably from 20 to 35 parts per 100 parts of the polyester. Examples of hydrophilic fillers that may be desirable to improve the hydrophilicity of the product include cellulosic fibers such as cotton and regenerated cellulose rayon fibers or filaments. The mixture may be poured into suitable molds and may then be allowed to react at atmospheric pressure, either with or without the application of external heating or attended by a moderate heating of say between 120° to 150° C., depending upon the size of the batch. The mixture reacts and the reaction is allowed to go on to completion to produce the foamed cellular plastic product. A post-curing at a temperature of from 120° to 250° F. and for up to 24 hours may be desirable although in most cases the exothermic heat produced by the reaction is all that is required.

After removal from the mold, the cellular product, which is quite hydrophobic in character at this stage, may, if desired, be cut to final size, and the product either before or after cutting is treated with an alkali metal sulfite or bisulfite, such as sodium or potassium sulfite, sodium or potassium bisulfite, or sodium or potassium metabisulfite under neutral alkaline, or acid conditions but preferably at a pH which is not under 5.5 and does not exceed a value of about 13 to avoid hydrolysis of ester groups. When a metabisulfite is employed, it is generally desirable to use an alkaline material such as caustic soda or potash to make the solution alkaline and convert the metabisulfite to a simple alkali metal bisulfite. When sulfites and bisulfites per se are used, neutral alkaline or acid conditions are suitable. The cellular structures may be immersed in a solution of the sulfite or bisulfite salts having concentrations of 1% up to saturation. The solutions may be exclusively aqueous or they may contain from 0.1% to 70% by weight of a solvent or swelling agent for the cellular structure, such as isopropanol, ethanol, n-butanol, acetone, methyl ethyl ketone, dimethylformamide, ethylene glycol, to improve the penetration and thereby increase the extent of treatment. They also may, optionally, contain 0.1 to 1% of a wetting agent either of anionic, non-ionic, or cationic type. The products may be held submerged in such solutions at room temperature for a period of 8 to 24 hours or more, or heat may be applied to raise the temperature up to as high as 80° to 100° C. and the treatment may be effected at such higher temperatures for 15 to 30 minutes. Preferably a temperature of about 55 to 65° C. for a time of about 1½ to 2½ hours is employed. After such treatment, the products are removed from the saturation bath and dried. They are now in hydrophilic condition containing sulfonic groups and adapted to be used for washing and cleaning purposes.

In the following examples, which are illustrative of the present invention, the parts and percentages are by weight:

*Example 1*

(a) To a stirred reaction vessel there are charged 401.0 parts of adipic acid, 35.5 parts of maleic acid, 587.5 parts of capric acid and 338.6 parts of glycerol. The reaction mixture is heated gradually up to 180° C. and the pressure is then reduced to 5 mm., the whole reaction taking thirty-five hours. A yield of 1190 parts of product is obtained which has an acid number of 2.2, a corrected hydroxyl number of 76.2, a molecular weight of 1512±32, and a Gardner-Holdt viscosity of Z5.

(b) To a mixture of 35.8 parts of the above polyester, 0.76 part of N-alkylmorpholine (the alkyl being derived from the alcohol mixture obtained by the hydrogenation of coconut oil fatty acids), 1.12 parts of water and 4 drops of a mold lubricant (e.g. silicone fluid, an unreactive trimethyl terminated poly(dimethylsiloxane) there is added with vigorous mixing 15.2 parts of a 65:35 mixture of the 2,4- and 2,6-isomers of toluenediisocyanate. The mixture is poured into a mold wherein it foamed. The foam is demolded after twenty-four hours.

(c) The urethane foam made from this resin when soaked overnight in water shows no measurable change in dimensions. The foamed product is submerged in a saturated sodium bisulfite solution at 60° C. overnight, is rinsed free of sodium salt with distilled water, and dried. The treated foam when placed in water swells 5% over its dry dimensions. The treated product when used for washing purposes is greatly improved over the foamed product which has not had a bisulfite treatment.

*Example 2*

(a) In a suitable container, there is prepared a mixture of 0.76 part of N-alkylmorpholine (the alkyl being derived from the alcohol mixture obtained by the hydrogenation of coconut oil fatty acids), 1.12 parts of water, 4 drops of a mold lubricant (e.g. silicone oil, an unreactive trimethyl terminated poly(dimethylsiloxane), and 28 parts of a polyester obtained from 43.6 parts adipic acid, 12.6 parts maleic anhydride, 50.4 parts of diethylene glycol and 2.6 parts of trimethylolmethane, the polyester having a molecular weight of 1345±33, an acid number of 2.7 and a corrected hydroxyl number of 84.0. To the mixture there is added with vigorous mixing 15.2 parts of a 65:35 mixture of the 2,4- and 2,6-isomers of toluenediisocyanate. The mixture is poured into a mold wherein it foams. The foam is demolded after twenty-four hours.

(b) The urethane foam made from this resin which does not swell in water is held in a saturated sodium bisulfite solution overnight at 60° C., washed, and dried. It swells 9.5% over its dry dimensions when immersed in water. Washing sponges made from the treated foam show marked improvement over the untreated cellular products.

*Example 3*

The urethane foam obtained in Example 2(a) is swollen by immersion in isopropanol for two hours at room temperature. Then it is treated with a bisulfite as in Example 2(b). It shows similar swelling characteristics.

*Example 4*

The urethane foam obtained in Example 2(a) is soaked three days at room temperature in a mixture of 145 parts of water, 97 parts of sodium metabisulfite, 7.3 parts of a 50% sodium hydroxide solution in water, and 145 parts of isopropanol. After rinsing and drying, the product shows swelling characteristics similar to those of the product obtained in Example 2(b).

*Example 5*

Similar results are obtained by following the procedure of Example 2 except the soaking in the bisulfite solution is effected at 100° C. for about an hour and the concentration is 5% of sodium bisulfite.

To facilitate definition in the claims, since, in the making of the polyesters, either acids or esters thereof may be used, reference to "acid-component" in the claims is intended to include both the free acid and any ester of the acid or mixtures thereof.

It is to be understood that changes and variations may be made without departing from the spirit and scope of the invention as defined in the appended claims.

We claim:

1. A method of making a hydrophilic foamed polyester-urethane product which comprises contacting with an aqueous solution of a salt selected from the group consisting of alkali metal sulfites and bisulfites, at a pH range of about 5.5 to about 13 and at a temperature from about 20° to about 100° C., a foamed mass of a reaction product of an organic polyisocyanate with a polyester resin comprising a polyester condensation product of a mixture comprising polyhydric alcohol and dicarboxylic acid components, said components being in the proportion of 1.2 to 1.8 mole of polyhydric alcohol to each mole of dicarboxylic acid, the dicarboxylic acid component comprising 90 to 65 mole percent of saturated dibasic aliphatic acid having not more than eighteen carbon atoms and 10 to 35 mole percent of an unsaturated compound selected from the group consisting of maleic acid, fumaric acid, itaconic acid, lower alkyl diester of one of said unsaturated acids, and mixtures thereof, said lower alkyl portion containing 1-2 carbon atoms, said foamed polyester-urethane mass containing points of ethylenic unsaturation whereby the salt adds across points of unsaturation to introduce hydrophilic groups selected from the group consisting of sulfonates and sulfonic acid groups.

2. A method as defined in claim 1 in which the polyhydric alcohol component comprises a dihydric alcohol.

3. A method as defined in claim 1 in which the polyhydric alcohol component comprises a trihydric alcohol.

4. A method as defined in claim 1 in which the polyhydric alcohol component comprises a mixture of a dihydric alcohol with at least 2 mole percent of polyhydric alcohol material having at least 3 carbon atoms per molecule.

5. A method as defined in claim 4 in which the mixture comprising polyhydric alcohol and dicarboxylic acid components also comprises a fatty acid component selected from the group consisting of fatty acids having eight to thirty carbon atoms and esters thereof with saturated alcohols having up to three carbon atoms.

6. A method of making a hydrophilic foamed polyetser-urethane product which comprises contacting with an aqueous solution of a salt selected from the group consisting of alkali metal sulfites and bisulfites, at a pH range of about 5.5 to about 13 and at a temperature from about 20° to about 100° C., a foamed mass of a reaction product of an organic polyisocyanate with a polyester resin comprising a polyester condensation product of a mixture comprising polyhydric alcohol and dicarboxylic acid components, said components being in the proportion of 1.2 to 1.8 mole of polyhydric alcohol to each mole of dicarboxylic acid, the dicarboxylic acid component comprising 75 to 70 mole percent of saturated dibasic aliphatic acid having not more than eighteen carbon atoms and 25 to 30 mole percent of an unsaturated compound selected from the group consisting of maleic acid, fumaric acid, itaconic acid, lower alkyl diester of one of said unsaturated acids, and mixtures thereof, said lower alkyl portion containing 1-2 carbon atoms, said foamed polyester-urethane mass containing points of ethylenic unsaturation whereby the salt adds across points of unsaturation to introduce hydrophilic groups selected from the group consisting of sulfonates and sulfonic acid groups.

7. A method as defined in claim 6 in which the polyhydric alcohol component comprises a dihydric alcohol.

8. A method as defined in claim 6 in which the polyhydric alcohol component comprises a trihydric alcohol.

9. A method as defined in claim 5 in which the polyhydric alcohol component comprises a mixture of a dihydric alcohol with at least 2 percent of polyhydric alcohol material having at least 3 carbon atoms per molecule.

10. A method as defined in claim 9 in which the mixture comprising polyhydric alcohol and dicarboxylic acid components also comprises a fatty acid component selected from the group consisting of fatty acids having 8 to 30 carbon atoms and esters thereof with saturated alcohols having up to 3 carbon atoms.

11. A method of making a hydrophilic foamed polyester-urethane product which comprises contacting with an aqueous solution of a salt selected from the group consisting of alkali metal sulfites and bisulfites, at a temperature from about 25° to 100° C. within the pH range of 5.5 to 13 a foamed mass of a reaction product of an organic polyisocyanate comprising a mixture of (A) a polyester of a mixture comprising polyhydric alcohol and unsaturated dicarboxylic aliphatic acid components, said components being in a proportion of 1.2 to 1.8 moles of polyhydric alcohol to each mole of dicarboxylic acid and the dicarboxylic acid component consists of at least one unsaturated compound selected from the group consisting of maleic acid, fumaric acid, itaconic acid, lower alkyl diester of one of said unsaturated acids, and mixtures thereof, said lower alkyl portion containing 1 to 2 carbon atoms, and (B) a polyester of a mixture comprising aliphatic saturated polyhydric alcohol and saturated dibasic aliphatic acid components having not more than eighteen carbon atoms, said mixture of Components A and B being in a proportion of 1:9 to 2:1 mole ratio, said mass containing points of ethylenic unsaturation whereby the salts add across the points of unsaturation to introduce hydrophilic groups selected from the group consisting of sulfonates and sulfonic acid groups.

12. A method as defined in claim 11 in which the polyhydric alcohol component comprises a dihydric alcohol.

13. A method as defined in claim 11 in which the polyhydric alcohol component comprises a trihydric alcohol.

14. A method as defined in claim 11 in which the polyhydric alcohol component comprises a mixture of a dihydric alcohol with at least 2 mole percent of polyhydric alcohols having at least 3 carbon atoms.

15. A method as defined in claim 14 in which the mixture comprising polyhydric alcohol and dicarboxylic acid components also comprises a fatty acid component selected from the group consisting of fatty acids having 8 to 30 carbon atoms and esters thereof with saturated alcohols having up to 3 carbon atoms.

16. A foamed polyester-urethane product having hydrophilic groups and capable of swelling in water, said product being obtained by the process of claim 1.

17. A foamed polyester-urethane product having hydrophilic groups and capable of swelling in water, said product being obtained by the process of claim 6.

18. A foamed polyester-urethane product having hydrophilic groups and capable of swelling in water, said product being obtained by the process of claim 5.

19. A foamed polyester-urethane product having hydrophilic groups and capable of swelling in water, said product being obtained by the process of claim 10.

20. A foamed polyester-urethane product having hydrophilic groups and capable of swelling in water, said product being obtained by the process of claim 11.

21. A method for making a hydrophilic foamed polyester-urethane product which comprises contacting with an aqueous solution of a salt selected from the group consisting of alkali metal sulfites and bisulfites, a foamed mass of a reaction product of an organic polyisocyanate with a polyester resin comprising a polyester condensation product of a mixture comprising polyhydric alcohol and dicarboxylic acid components, said components being in the proportion of about 1.2 mole of polyhydric alcohol to 1 mole of dicarboxylic acid, the dicarboxylic acid component comprising about 65 mole percent of saturated dicarboxylic aliphatic acid and about 35 mole percent of an unsaturated dicarboxylic acid selected from the group consisting of maleic acid and fumaric acid, said foamed polyesterurethane mass containing points of ethylenic unsaturation whereby the salt adds across points of unsaturation to introduce hydrophilic groups selected from the group consisting of sulfonates and sulfonic acid groups.

22. A method for making a hydrophilic foamed polyesterurethane product which comprises contacting with an aqueous solution of a salt selected from the group consisting of alkali metal sulfites and bisulfites, a foamed mass of a reaction product of an organic polyisocyanate with a polyester resin which resin is the reaction product of a mixture comprising polyhydric alcohol and dicarboxylic acid components, the number of hydroxyl groups of said polyhydric alcohol component being present in said mixture in excess of the carboxyl groups of the dicarboxylic acid component so as to provide a hydroxyl containing polyester, the dicarboxylic acid component comprising about 65 to about 76 mole percent of saturated dicarboxylic aliphatic acid and about 35 to about 24 mole percent respectively of an unsaturated dicarboxylic acid selected from the group consisting of maleic acid and fumaric acid, said foamed polyesterurethane mass containing points of ethylenic unsaturation whereby the salt adds across points of unsaturation to introduce hydrophilic groups selected from the group consisting of sulfonates and sulfonic acid groups.

23. A foamed polyesterurethane product having hydrophilic groups and capable of swelling in water, said product being obtained by the process of claim 22.

References Cited in the file of this patent

UNITED STATES PATENTS

| 2,454,546 | Bock et al. | Nov. 23, 1948 |
| 2,577,279 | Simon et al. | Dec. 4, 1951 |